United States Patent
Brundridge et al.

(10) Patent No.: US 6,944,800 B2
(45) Date of Patent: Sep. 13, 2005

(54) DYNAMIC DISPLAY OF PERSONAL COMPUTER SUPPORT INFORMATION

(75) Inventors: Michael A. Brundridge, Georgetown, TX (US); Anish C. Desai, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 509 days.

(21) Appl. No.: 09/854,364

(22) Filed: May 11, 2001

(65) Prior Publication Data

US 2003/0074607 A1 Apr. 17, 2003

(51) Int. Cl.[7] .............................................. G06F 11/00
(52) U.S. Cl. ........................... 714/48; 715/705; 714/57
(58) Field of Search .............................. 714/48, 57, 52; 707/202; 715/708, 709, 710, 705, 738, 969, 753, 751; 345/708, 709, 710, 705, 736, 738, 969, 751, 753

(56) References Cited

U.S. PATENT DOCUMENTS

| | | | | |
|---|---|---|---|---|
| 5,463,768 A | * | 10/1995 | Cuddihy et al. | 714/37 |
| 5,892,898 A | * | 4/1999 | Fujii et al. | 714/57 |
| 6,128,017 A | * | 10/2000 | Alimpich et al. | 345/808 |
| 6,243,090 B1 | * | 6/2001 | Machiraju et al. | 345/709 |
| 6,438,716 B1 | * | 8/2002 | Snover | 714/57 |
| 6,526,529 B1 | * | 2/2003 | Miksovsky et al. | 714/57 |
| 6,542,897 B2 | * | 4/2003 | Lee | 707/102 |
| 2003/0028448 A1 | * | 2/2003 | Joseph et al. | 705/27 |

* cited by examiner

*Primary Examiner*—Dieu-Minh Le
*Assistant Examiner*—Christopher McCarthy
(74) *Attorney, Agent, or Firm*—Baker Botts L.L.P.

(57) ABSTRACT

A method and system of detecting and reporting failures in a computer, in particular a personal computer is disclosed. Event codes related to failure events are given unique alpha numeric designations, allowing universal recognition of failures related to diagnostic programs that are ran. The unique event codes are stored in an error log when a particular failure is found through the operation of a diagnostic program. The error log is parsed as to determined values and can be minimized further by eliminating redundant occurrences of the event codes. Event codes can be related to frequently asked question (FAQ) files, the FAQ files can then be presented to a user. In certain cases, the presented FAQ files can be minimized further by a template that masks out irrelevant FAQ files. The FAQ file that are considered relevant can be predetermined per the requirements of the user.

15 Claims, 5 Drawing Sheets

DYNAMIC DISPLAY OF PERSONAL COMPUTER SUPPORT INFORMATION

BACKGROUND OF THE INVENTION

1. Field of the Invention

This invention relates to a method and to a system to display support information related to a personal computer.

2. Description of the Related Art

Computers, in particular personal computers (PC), include numerous complex devices and systems. Various devices relate to input and output, computing memory, computing storage, and processing. Often times these devices fail and an end-user must determine the problem device, find the cause, and determine the solution as to fixing the problem. PC end-users typically are not technically proficient to address the experienced failures. PC manufacturers can provide support groups which an end-user can call and request assistance from a trained technician.

A technician familiar with the particular PC architecture and or device, typically is able to provide suggestions as to possible causes of the failure. The technician offers these suggestions through a list of frequently asked questions (FAQ) related to the problem. Typically there are many causes for a particular problem. For example in the case of a floppy disk drive, there can be read or write problems. These problems can be a cause of faulty hardware. Sometimes the problem that is experienced is due to having a corrupted floppy disk in the drive.

A trained technician is able to sort through all the possible FAQs and corresponding causes and identify the most likely cause or causes. In certain cases, the FAQs are provided locally in a PC. The FAQ files are arranged in an order that relates FAQs to particular components and or devices. By having the FAQs reside on the PC, the intent is that end-users are able to access the FAQs, and identify the problem (s) themselves without consultation. This would eliminate the calls to the support group. In certain software programs that provide FAQs, the individual FAQs are organized as separate files. The files can be structured in a hierarchical manner. If a top level FAQ is requested, typically all the FAQ files below the top level FAQ file are presented to the end-user. The FAQ list is not sorted out to present the relevant FAQ(s) that is needed by the end-user.

A solution to prevent listing a great number of FAQs to the end-user is to present the most commonly occurring FAQs. This solution fails when the FAQ(s) related to the particular problem is not presented. An end-user is forced to request all the FAQ files, and receives a large list of FAQs. Overwhelmed by the information provided, the end-user typically ends up calling the technical support group, defeating the purpose of locally providing the FAQs to the end-user.

To assist in trouble shooting problems, many PCs make use of diagnostic programs that troubleshoot and identify problems in components and devices in a PC. Like the FAQ, these diagnostic tests typically provide a great number of results. For example, if a diagnostic test (also called a test module) is performed on a floppy drive, the errors that are identified can be caused by read or write problems. These read or write problems in turn can be caused by line problems connecting the drive to the PC system. Typically diagnostic results are presented in a terse manner, with minimum explanations as to the cause of the problem, and no recommendations as to fixing the problem. The diagnostic program typically lists all the problems, and their related problems, to the end-user. The end-user is therefore presented with a large number of cryptic messages related to possible causes. Diagnostic programs are a tremendous tool for trained technicians, however, the results from the diagnostic programs are useless to many end-users who are merely looking for an answer to a problem and not to causes of the problem.

Because diagnostic programs are written in the English language, the results that are created by the diagnostic programs are in English. Any user, whether it be an unskilled end-user or highly skilled PC technician, must be able to read English to decipher the generated results of the diagnostic program. A non-English reading user can not make use of the diagnostic results that are printed out. Considering the global community of PC users, and the multitude of languages used by PC users, it would be cost prohibitive if not impossible, to provide diagnostic programs that are language friendly to all PC users.

Therefore, there is a need for a method and a system that provide end-user support information such as diagnostics in a form in which displayed information is pertinent, easily used, and provides concise answers to computer problems or failures.

SUMMARY OF THE INVENTION

What is needed and is disclosed herein is an invention that provides for a method and a system for detecting and reporting failures of devices in a computer system by assigning event codes to particular failures. When a particular failure occurs, the related event code is stored in an error log. The event codes are given universal alpha numeric designations that can be interrupted irrespective of the user's language.

In certain embodiments of the invention, the error log can be parsed for determined values based on particular diagnostic events. The event codes can be related to particular frequently asked question (FAQ) files that assist in identifying the cause of the problem or problems.

The resulting FAQ files can be presented to a user. In certain embodiments of the invention are written in hyper text markup language (HTML) to present a user friendly interface that is able to link to other FAQ files.

In certain embodiments of the invention the error log can be parsed for redundant event codes to minimize the error log list.

Other embodiments of the invention provide for a template that contains all FAQ files. The error log is looked at, and non relevant FAQ files are masked out to the user. Only FAQ files relevant or needed by the particular user are presented.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and it's numerous objects, features and advantages made apparent to those skilled in the art by referencing the accompanying drawings. The use of the same reference number throughout the figures designates a like or similar element.

Figure 1:
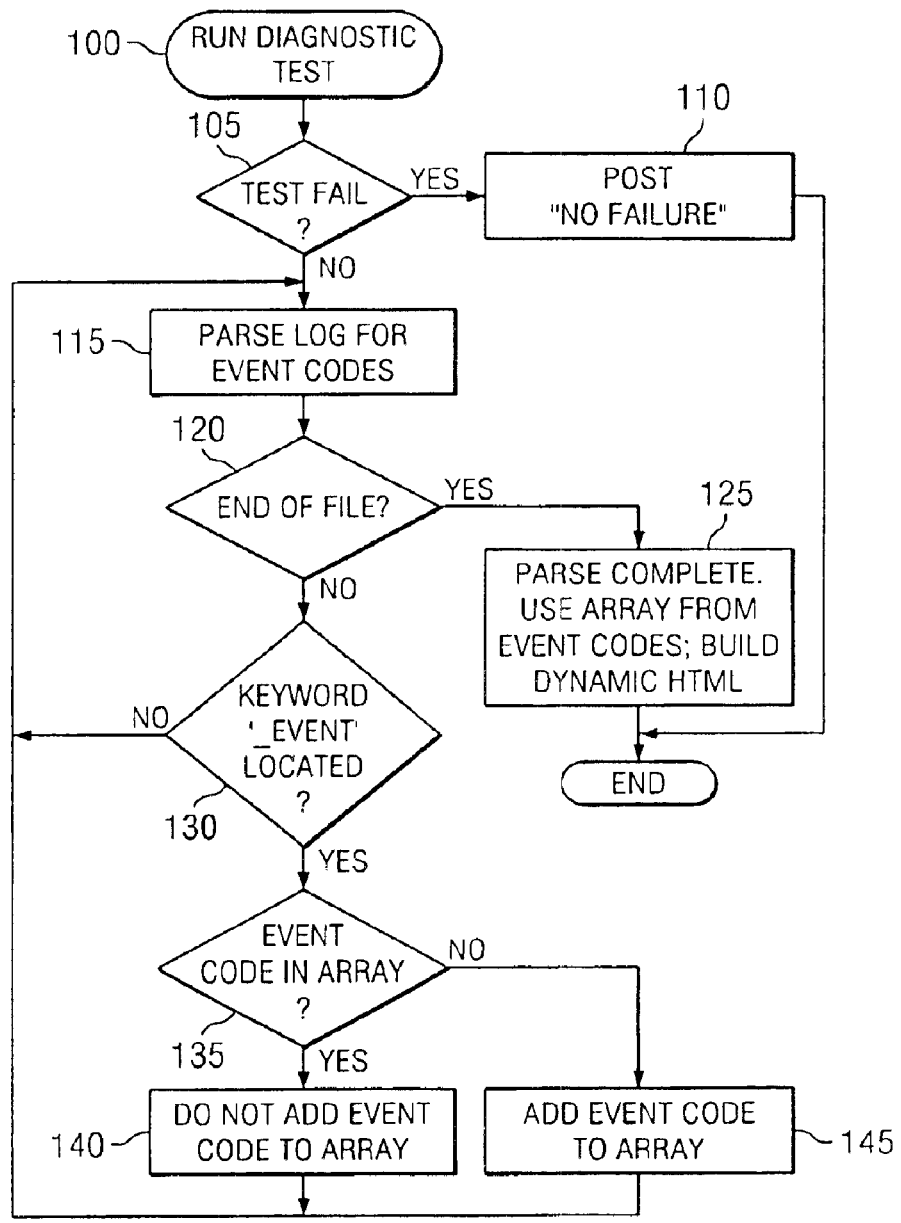
FIG. 1 is a flow chart illustrating parsing an error log.

While the invention is susceptible to various modifications and alternative forms, specific embodiments thereof are shown by way of example in the drawings and will herein be described in detail, it should be understood, however, that the drawings and detailed description thereto are not intended to limit the invention to the particular form disclosed but on the contrary, the intention is to cover all modifications, equivalents, and alternatives falling within the scope of the present invention as defined by the appended claims.

DETAILED DESCRIPTION

In embodiments of the invention, the FAQs are presented using hyper text markup language (HTML) pages. HTML pages provide a user-friendly interface and provide linking to other pages. Diagnostics can be related to FAQs in the following manner. An end-user with a problem acknowledges the problem and runs a diagnostic program directed to the particular device; the diagnostic can be built into the device. If the diagnostic program finds a failure, the diagnostic program returns a "errorlevel" condition from the diagnostic command line application. An "errorlevel" condition can be a "0" for pass or a "1" for fail. A parsing program is performed to locate error strings that are compared to a known value. The parsing program can be written in a language such as a Java® by Sun Microsystems, Inc. These error strings are placed in an error log. Once an "errorlevel" condition other than "0" is received, the error log can be parsed in order to locate the error strings that are compared to the known value. Upon detection of string compares, the parsing program assembles the appropriate FAQs to be displayed to the end-user to utilize in self-repair of the system.

In certain embodiments of the invention, error string parsing compares are avoided. In these instances, a keyword is placed in the error log after an error string along with an event code (error code). The event code has an alpha-numeric designation. As the diagnostic program tests a component or device, the diagnostic program generates diagnostic events for each error it encounters and writes the error string and event code to the error log. The following is an example of such an error log.

---

Testing started at 12:42:00 PM 8/25/2000
Floppy Test: Linear Seek - N/A
Warning: could not obtain drive size parameters for drive 1 of 1.
    You probably don't have a floppy disk in the drive. To test
    the drive, insert a formatted disk and run this test again.
    __EVENT:30__22
Floppy Test: Random Seek - N/A -continued Warning: could not obtain drive size parameters for drive 1 of 1.
    You probably don't have a floppy disk in the drive. To test
    the drive, insert a formatted disk and run this test again.
    __EVENT:30__22
Floppy Test: Funnel Seek - N/A
Warning: could not obtain drive size parameters for drive 1 of 1.
    You probably don't have a floppy disk in the drive. To test
    the drive, insert a formatted disk and run this test again.
    __EVENT:30__22
Floppy Test: Surface Scan - N/A
Warning: could not obtain drive size parameters for drive 1 of 1.
    You probably don't have a floppy disk in the drive. To test
    the drive, insert a formatted disk and run this test again.
    __EVENT:30__22
Testing completed at 12:42:00 PM 8/25/2000

---

The error log can be parsed for the keyword and a list of event codes can be built. A diagnostic program now is able to write many events to an error log. In operating systems such as Windows® by the Microsoft Corporation, this is of great benefit, since Windows® and similar operating systems can only report one return code and only report one failure.

When a diagnostic test is ran, and if the "errorlevel" returned by the command line program is a non-zero, a program is called to parse the error log. An example of such a parsing program is the following script written in Java®.

```
/* ****************************************************
* Function:           Return a list of error codes found in
                      the log file
* Return Value:  String[]: Return an array of errorcodes
* Function Inputs:    String: Fully qualified logfile path
*                     String: Name of vendor
* ****************************************************/
public String[] GetErrorCodes(String logname, String vendor)
{
    Vector errcodes = new Vector(1);
    int i = 0;
    String errStored = null;
    // Build the error code list and return it in a vector
    errcodes = BuildErrorCodeList(logname, vendor);
    // Build a string array the size of the Vector
    String err[] = new String[errcodes.size()];
    // Enum the vector for use
    Enumeration errEnum = errcodes.elements();
    /* Build the String array to pass back to the caller */
    while(errEnum.hasMoreElements())
    {
        errStored = (String)errEnum.nextElement();
        err[i] = new String();
        err[i] = errStored.trim();
        i++;
    }
    return(err);
}
/* ****************************************************
* Function:           Build the error code vector list
* Return Value:       Vector: Containing all the errorcodes
* Function Inputs:    String: Fully qualified path to the logfile
*                     String: Name of the vendor
* ****************************************************/
private Vector BuildErrorCodeList(String logfile, String vendor)
{
    Vector errcodes = new Vector(1);
    System.out.println("BuildErrorCodeList():");
    try
    {
        Enumeration errEnum = errcodes.elements();
        File fileToParse = new File(logfile);
        String input = null;
        String errcode = null;
```

-continued

```
        String errStored = null;
        int ln = 0;
        int colon = 0;
        boolean EOF = false;
        int loc = -1;
        int errCount = 0;
        int elementCount = 0;
        if(fileToParse.exists())
        {
            BufferedReader errorLog = new BufferedReader(new FileReader(fileToParse));
            while(!EOF)
            {
                try
                {
                    input = errorLog.readLine();
                    loc = input.indexOf("_EVENT");
                    if(loc != -1)
                    {
                        /* found an errorcode string */
                        colon = input.indexOf(":");
                        colon++;
                        ln = input.length();
                        errcode = input.substring(colon, ln);
                        errCount++;
                        AddErrorCode(errcode, errcodes);
                    }
                }
                catch (EOFException e)
                {
                    /* End of file, exit */
                    EOF = true;
                }
                catch (NullPointerException e)
                {
                    /* End of file, exit */
                    EOF = true;
                }
                catch (IOException e)
                {
                    System.out.println("Not able to do a readLine() from errorlog");
                }
            }
        }
        catch(FileNotFoundException e)
        {
            /* File not found */
            System.out.println("File:" + logfile + "not found.");
            m_mainXml.SetInteresting(m_dellTools.GetResource("file")+" " + logfile + " " + m_dellTools.GetResource("notfound"));
            m_mapApi.LogXMLEntity(m_mainXml);
        }
        errcodes.trimToSize();
        return((Vector)errcodes);
}
```

The preceding Java® script opens the error log and begins search for the keyword "_EVENT." Once "_EVENT" is located, the script will retrieve the data to the immediate right of "_EVENT" until a white space character is received. The script continues parsing the error log until the end of file (EOF) is reached. Each time the script locates "_EVENT," data is retrieved. If the event code is a duplicate of one stored in the array, the script will ignore the redundant event code. Otherwise, a new event code is added to the array. Once the error log has reached the EOF, the array is utilized to build a FAQ list that is displayed to the end user. Since an alpha-numeric event code is used and not an event string, there is no language dependence.

FIG. 1 illustrates a flow chart for parsing the error log. The parsing begins when a diagnostic test is ran, step 100. A determination is made if the test has failed or passed, step 105. If the test did not fail, a "no failure" is posted, step 110, and the process ends. If the test did fail, the error log is parsed for event codes, step 115. A determination is made if the EOF is reached, step 120. If the EOF is reached, the parsing process is complete and the array is used to build a dynamic HTML interface for the user, step 125. The process then ends. If the EOF is not reached, the keyword "_EVENT" is searched, step 130. If "_EVENT" is not found the process returns to step 115. If "_EVENT" is found, a determination is made if the identified event code is already in the array, step 135. If the event code is already in the array, the event code is not added to the array, step 140, and the process returns to step 115. If the event is not in the array, the event is added to the array, step 145, and the process returns to step 115.

End-users of PCs have different requirements and needs, therefore diagnostic messaging can be tailored to specific end-user groups. Specific PC architectures can also be separated out and identified as to specific diagnostics that can be used. Likewise, component or device types can be reported with different diagnostic reporting packages.

Like diagnostic reports, FAQs can be tailored to specific end-user groups. By relating diagnostics with FAQs an end-user can be provided with troubleshooting procedures to allow the end-user to resolve the problems.

FAQs can be categorized into two criteria: 1) a failed FAQ, a FAQ that is displayed to the end-user if the diagnostic has determined a component or device under test to have failed, and is usually specific to the failure or failures; or 2) a passed FAQ, a FAQ that is displayed to the end user if the component under test has passed, which gives the end-user suggestions as to troubleshooting the problem if problems are still experienced.

With the use of the earlier described event codes and the ability to record multiple events for each device under test, there is the capability to narrow down events or errors that are reported and to provide summarized information to an end-user. The summarized information is the appropriate help needed by the end-user.

A typical scenario is a user calling up a diagnostic program, and selecting a component or device to be tested. The diagnostic program, or the test module in specific, generates a diagnostic event for each error that the test module finds. The diagnostic program writes the event code to the error log.

The previously described parsing routine is executed on the error log to extract the event codes. Event codes are now minimized, and only relevant event codes are made available to the end-user. In order to provide detailed help to the end user, particular event codes are related to particular FAQ files. The end-user then is able to choose among the FAQs that are presented.

The FAQs are initially placed in a pre-configured database that allows the user to list the FAQs on demand without any particular indexing order. The FAQ set is indexed using the event codes that can be obtained when the diagnostic is run. The indexing is performed prior to product (device) installation on the PC system, and the indexed image is stored in the pre-configured database.

Using the event codes, a dynamic FAQ list can built that is displayed to the end-user. The dynamic FAQ list provides a user-friendly interface, with links to different FAQ pages. The end-user is able to pick and choose from various FAQs using the dynamic FAQ list.

The dynamic FAQ list is achieved by using the output of the diagnostic test as a mask to expose the appropriate HTML content. An HTML file called the HTML template, containing all possible content (or respective links) is used. The HTML template is masked out, the masking depends on the event codes that are generated. The HTML template is targeted by the device that is to be opened at the end of the diagnostic targeted for the device. The masking is performed at runtime using the previously described Java® script. The Java® script looks at the generated event-codes and decides which corresponding FAQs are to be displayed. The desired content is filtered out and exposed while the rest of the static content is masked out (i.e. made invisible to the end-user).

Generally a static framework involves the creation of a static HTML page for every possible scenario of presentation and then opening or loading the HTML page in the browser at run-time. This can lead to a redundancy between each of the HTML files that can be produced. It is desirable to have a single instance of display for each of the FAQs, which can be achieved by using the HTML template, as long as there is only one instance of this file in the system. The overall FAQ presentation solution therefore needs to have the capability to point to a single instance of the HTML template and feed the HTML template with the appropriate input for masking the irrelevant content while the HTML template gets loaded within the browser.

Figure 2:
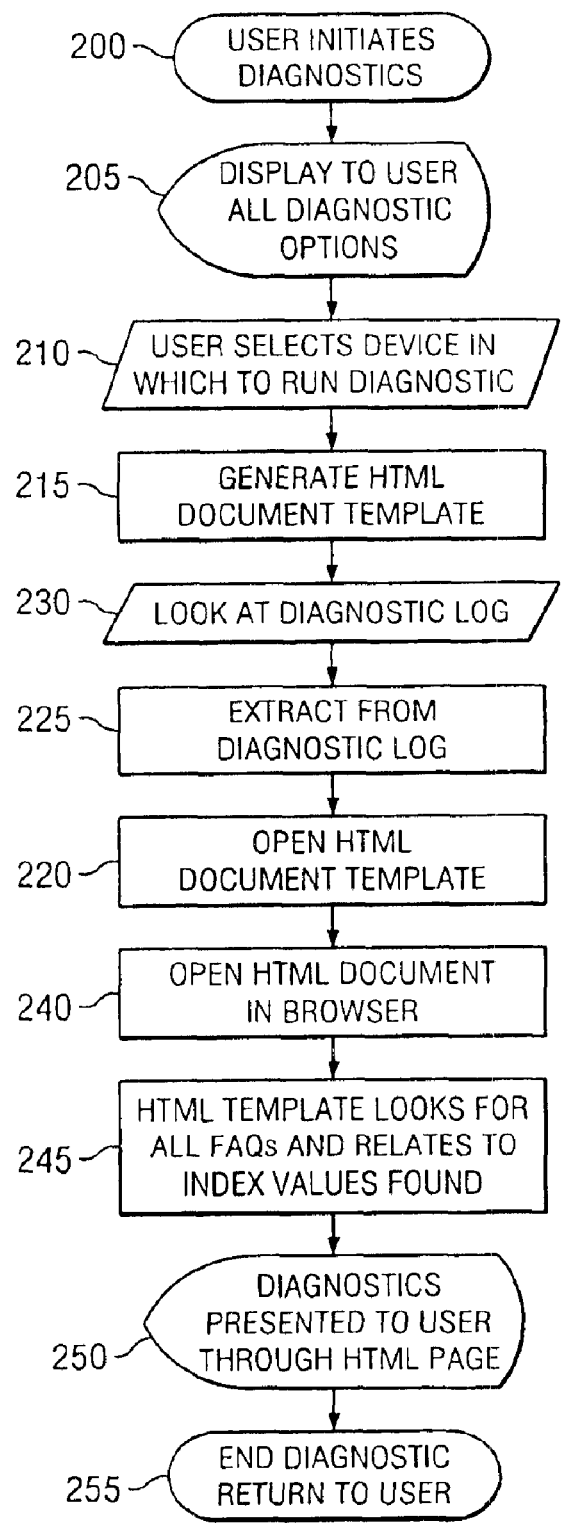
FIG. 2 is a flow chart illustrating a diagnostic and FAQ reporting session.

FIG. 2 is a flow chart illustrating the diagnostic process and displaying to an end-user a FAQ in the form of an HTML page to the end-user. A diagnostic is started on a particular device when an end-user initiates diagnostic testing, step 200. The end-user is presented with a list of diagnostic options that are available, in particular devices in which diagnostics tests can be performed on, step 205. The end-user selects the device to perform diagnostic upon, step 210. An HTML document template is generated, step 205. In generating the HTML document template, all FAQs are indexed for all diagnostics based on the following:

1) Result of Status of a diagnostic, which can be "passed" (also called "hardware") or "failed."

2) Name of Diagnostic (e.g. Floppy Drive).

3) Error codes (event codes).

The preceding three values are referred to as index values.

The following HTML code is placed within an HTML page, and generates the desired HTML document template page. An embodiment of the invention uses a preprocessor in the device in which the diagnostic is being ran. The preprocessor processes the HTML code.

```
var FAQ = new Array ( );
    <assign i = "n">
    <list load.scuhwj3yo3klya2uvdcmfg.subcats as cat1>
        <if cat1.name == "Failed" || cat1.name ==
        "Hardware">
        FAQ["${cat1.name}"] = new Array ( );
            <list cat1.subcats as cat2>
                str = "${cat2.name}"
                str1 = str.replace(/[ -V.]/g, "")
```

-continued

```
                FAQ["${cat1.name}"][str1] = new Array ( );
                <if cat1.name == "Failed">
                FAQ["${cat1.name}"][str1]["${notes.name}"] =
                new FinalValue ("$ {notes.url}",
"$ {notes.abstract}");
                </if>
            </list>
        </if>
    </list>
```

The preprocessor interprets this logic and traverses all FAQs in the database and indexes the FAQs for masking by way of an array that is indexed by the event codes. "Failed" and "Passed" (Hardware) are states decided by the diagnostic depending on the presence of a diagnostic error code (event code).

In the preceding HTML code, the word "str1" is a storage variable that holds the diagnostic name provided at run time. Run time is the period while the device is executing. Operation is performed by the logic while the product is executing, as compared to an operation in which the operation is performed by a pre-configured setting.

The process continues with step 230, looking at the diagnostic log, also known as the previously described error log. The following records are extracted, as illustrated by step 225, from the diagnostic log:

1) "Passed" or "Failed"

2) Error codes.

The previously created HTML document template is opened, after reading in the three index values, step 220. An HTML document is opened in the browser, step 240.

The HTML document template is looks for at all the FAQs athat are provided and their respective index values. The FAQs that have the appropriate index values are selected and will be shown, step 245. The following file is from the HTML template after the preprocessor indexes all the FAQs based on criteria that enable the previous Java® script to mask out the non applicable FAQs.

The numbers "30_18", "30_1", "30_2" and "30_22" illustrate possible error codes of the diagnostic on a floppy drive. Only a subset of these error codes can be submitted to the Java® script. The Java® script looks at the following file and displays the FAQs that correspond to those error codes.

```
str = "Floppy Drive"
    str1 = str.replace(/[-V.]/g, "")
    FAQ["Failed"][str1] = new Array ();
        FAQ["Failed"][str1]["30_18"] = new FinalValue
("/Dell/mots/content/sco/scoaphuajy4646rtrrzxgz/snqhryxrdnw2msuzrvj3yx.mots", "The Resolution
Assistant floppy disk diagnostic was halted due to verification errors.");
```

-continued

FAQ["Failed"][str1]["30_1"] = new FinalValue
("/Dell/mots/content/sco/scoaphuajy4646rtrrzxgz/snfpwrx2nctcmevulttgn2.mots", "Resolution
Assistant detected that "No floppy drives are present".");
        FAQ["Failed"][str1]["30_2"] = new FinalValue
("/Dell/mots/content/sco/scoaphuajy4646rtrrzxgz/sne55odjmj4fsyvrfy3wha.mots", "Floppy drive is
exhibiting errors.");
        FAQ["Failed"][str1]["30_22"] = new FinalValue
("/Dell/mots/content/sco/scoaphuajy4646rtrrzxgz/snkl5i635e1xccohnp4h1h.mots", "Detected there was
NO MEDIA in the floppy drive");

A possible execution scenario could result in the following HTML content being presented to a customer after having run the "Floppy Drive" diagnostic, which "FAILED" with the error code "30_22". In this particular case either the end-user did not have media inserted in the device under test, or the drive is not able to detect the media.

The relevant FAQs and their related diagnostic are presented in an HTML output page, step 250. Once the diagnostic is completed and the FAQ presented, control is returned to the end-user, step 255.

Figure 3:
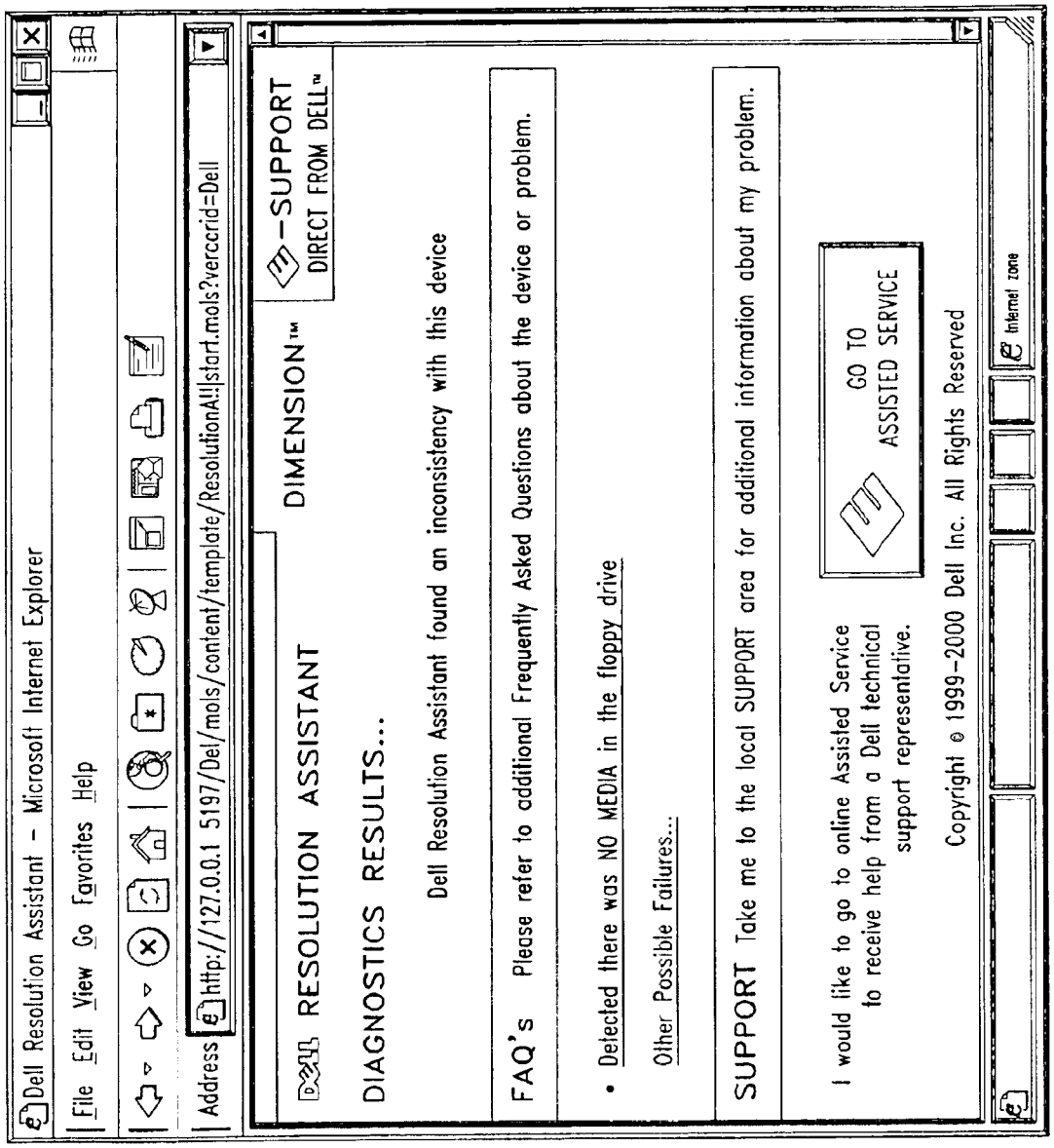
FIG. 3 is an exemplary output page for a diagnostic run on a particular device, and providing relevant the relevant FAQ.

FIG. 3 illustrates a example of an HTML output page illustrating a FAQ to the end-user. Only the relevant FAQ page is presented to the end-user, the result of the diagnostic that was performed on the particular device. In this particular example, a FAQ was returned that no media exists in the floppy drive. The user is also provided an option to look at other possible failures by way of a link on this particular HTML page.

An Example Computing and Network Environment

Figure 4:
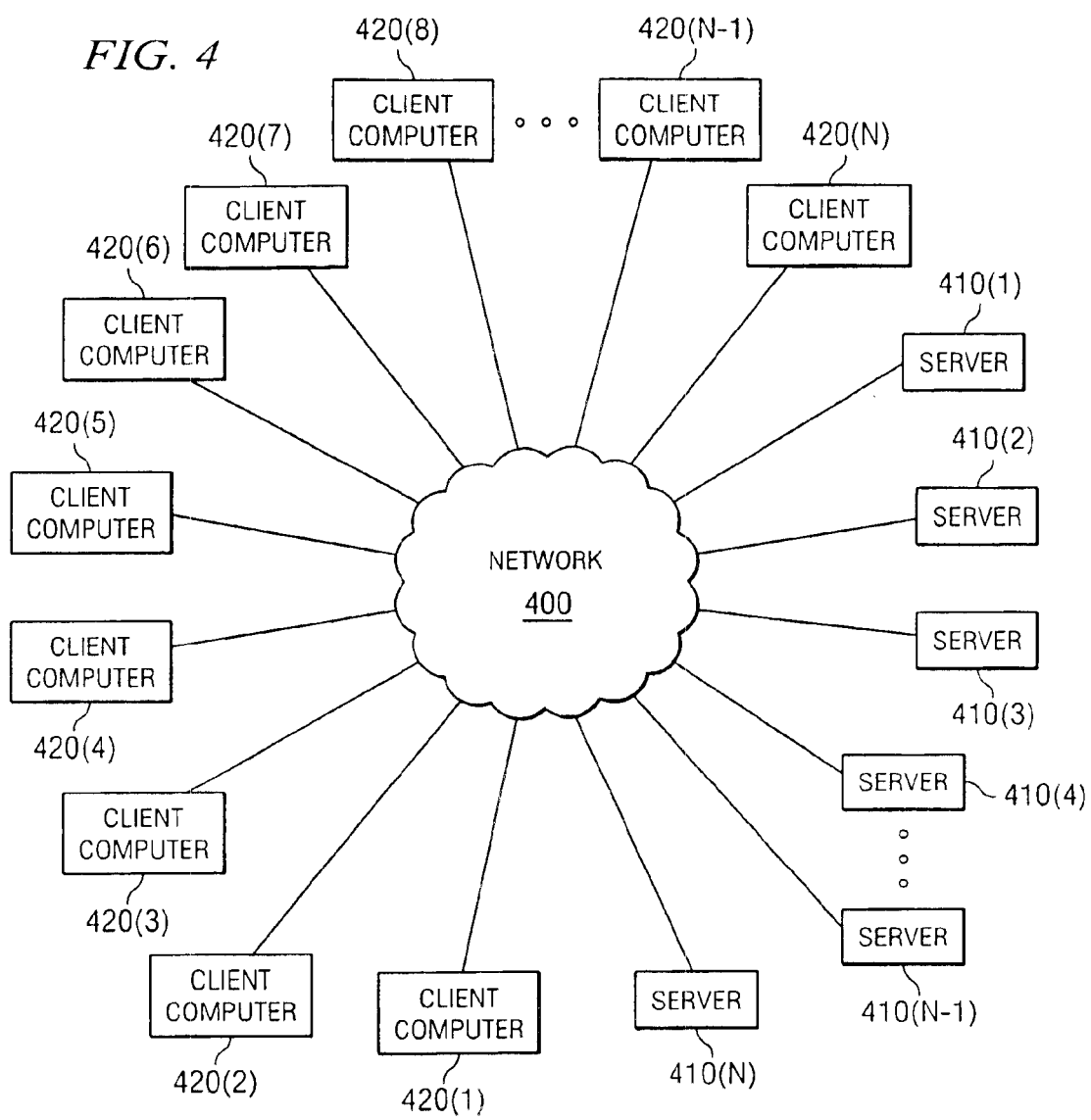
FIG. 4 is a block diagram illustrating a network environment in which a system according to the present invention may be practiced

FIG. 4 is a block diagram illustrating a network environment in which a system according to the present invention may be practiced. As is illustrated in FIG. 4, network 400, such as a private wide area network (WAN) or the Internet, includes a number of networked servers 410(1)–(N) that are accessible by client computers 420(1)–(N). Communication between client computers 420(1)–(N) and servers 410(1)–(N) typically occurs over a publicly accessible network, such as a public switched telephone network (PSTN), a DSL connection, a cable modem connection or large bandwidth trunks (e.g., communications channels providing T1 or OC3 service). Client computers 420(1)–(N) access servers 410(1)–(N) through, for example, a service provider. This might be, for example, an Internet Service Provider (ISP) such as America On-Line™, Prodigy™, CompuServe™ or the like. Access is typically had by executing application specific software (e.g., network connection software and a browser) on the given one of client computers 420(1)–(N).

One or more of client computers 420(1)–(N) and/or one or more of servers 410(1)–(N) may be, for example, a computer system of any appropriate design, in general, including a mainframe, a mini-computer or a personal computer system. Such a computer system typically includes a system unit having a system processor and associated volatile and non-volatile memory, one or more display monitors and keyboards, one or more diskette drives, one or more fixed disk storage devices and one or more printers. These computer systems are typically information handling systems which are designed to provide computing power to one or more users, either locally or remotely. Such a computer system may also include one or a plurality of I/O devices (i.e., peripheral devices) which are coupled to the system processor and which perform specialized functions. Examples of I/O devices include modems, sound and video devices and specialized communication devices. Mass storage devices such as hard disks, CD-ROM drives and magneto-optical drives may also be provided, either as an integrated or peripheral device. One such example computer system, discussed in terms of client computers 420(1)–(N) is shown in detail in FIG. 5.

Figure 5:
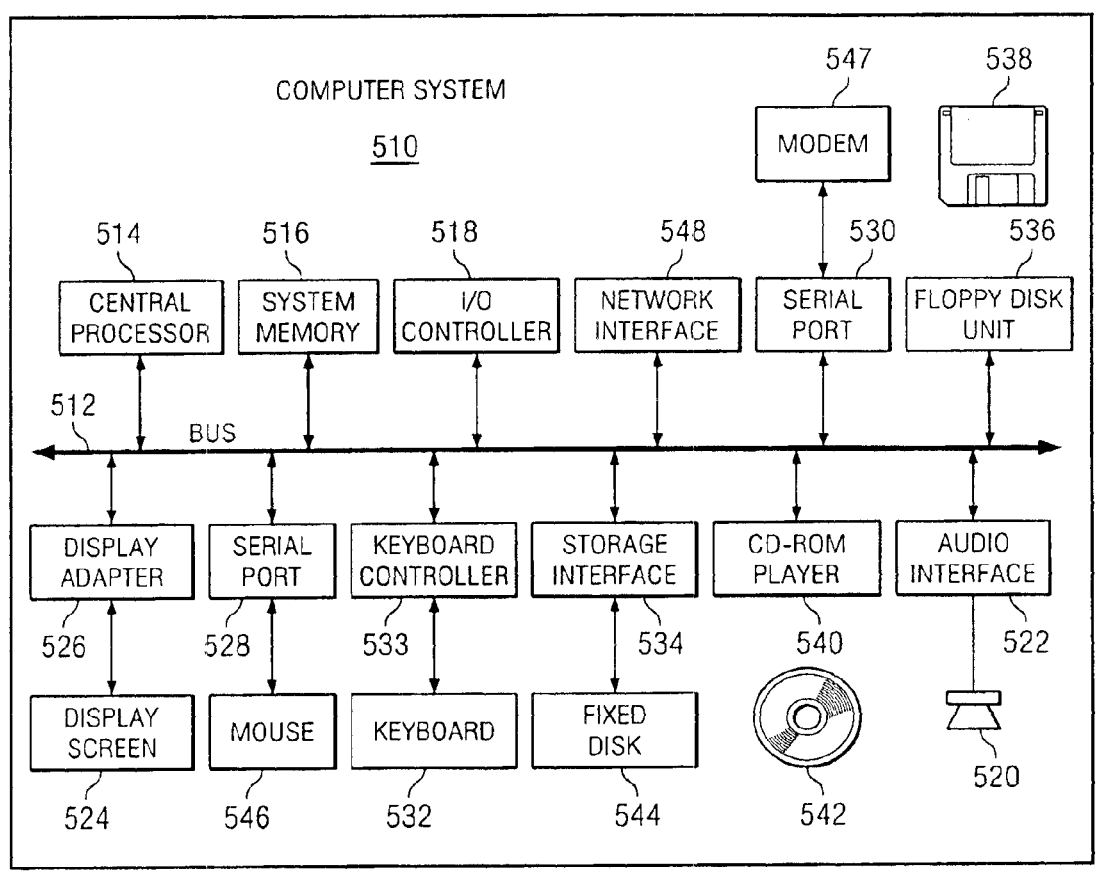
FIG. 5 is a block diagram of a computer system suitable for implementing the present invention.

FIG. 5 depicts a block diagram of a computer system 510 suitable for implementing the present invention, and example of one or more of client computers 420(1)–(N). Computer system 510 includes a bus 512 which interconnects major subsystems of computer system 510 such as a central processor 514, a system memory 516 (typically RAM, but which may also include ROM, flash RAM, or the like), an input/output controller 518, an external audio device such as a speaker system 520 via an audio output interface 522, an external device such as a display screen 524 via display adapter 526, serial ports 528 and 530, a keyboard 532 (interfaced with a keyboard controller 533), a storage interface 534, a floppy disk drive 536 operative to receive a floppy disk 538, and a CD-ROM drive 540 operative to receive a CD-ROM 542. Also included are a mouse 546 (or other point-and-click device, coupled to bus 512 via serial port 528), a modem 547 (coupled to bus 512 via serial port 530) and a network interface 548 (coupled directly to bus 512).

Bus 512 allows data communication between central processor 514 and system memory 516, which may include both read only memory (ROM) or flash memory (neither shown), and random access memory (RAM) (not shown), as previously noted. The RAM is generally the main memory into which the operating system and application programs are loaded and typically affords at least 66 megabytes of memory space. The ROM or flash memory may contain, among other code, the Basic Input-Output system (BIOS) which controls basic hardware operation such as the interaction with peripheral components. Applications resident with computer system 510 are generally stored on and accessed via a computer readable medium, such as a hard disk drive (e.g., fixed disk 544), an optical drive (e.g., CD-ROM drive 540), floppy disk unit 536 or other storage medium. Additionally, applications may be in the form of electronic signals modulated in accordance with the application and data communication technology when accessed via network modem 547 or interface 548.

Storage interface 534, as with the other storage interfaces of computer system 510, may connect to a standard computer readable medium for storage and/or retrieval of information, such as a fixed disk drive 544. Fixed disk drive 544 may be a part of computer system 510 or may be separate and accessed through other interface systems. Many other devices can be connected such as a mouse 546 connected to bus 512 via serial port 528, a modem 547 connected to bus 512 via serial port 530 and a network interface 548 connected directly to bus 512. Modem 547 may provide a direct connection to a remote server via a telephone link or to the Internet via an Internet service provider (ISP). Network interface 548 may provide a direct connection to a remote server via a direct network link to the Internet via a POP (point of presence). Network interface 548 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 5 to be present to practice the present invention. The devices and subsystems may be interconnected in different ways from that shown in FIG. 5. The operation of a computer system such as that shown in FIG. 5 is readily known in the art and is not discussed in detail in this application. Code to implement the present invention may be stored in computer-readable storage media such as one or more of system memory 516, fixed disk 544, CD-ROM 542, or floppy disk 538. Additionally, computer system 510 may be any kind of computing device, and so includes personal data assistants (PDAs), network appliance, X-window terminal or other such computing device. The operating system provided on computer system 510 may be MS-DOS®, MS-WINDOWS®, OS/2®, UNIX®, Linux® or other known operating system. Computer system 510 also supports a number of Internet access tools, including, for example, an HTTP-compliant web browser having a Java-Script interpreter, such as Netscape Navigator® 8.0, Microsoft Explorer® 8.0 and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 510). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Figure 6:
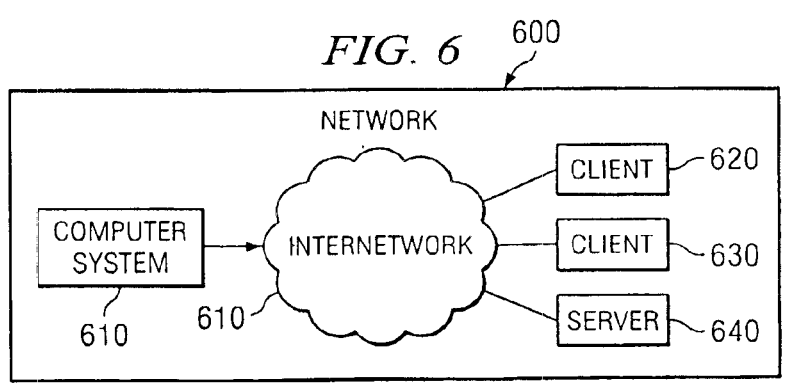
FIG. 6 is a block diagram illustrating the interconnection of the computer system of FIG. 5 to client and host systems.

FIG. 6 is a block diagram depicting a network 600 in which computer system 510 is coupled to an internetwork 610, which is coupled, in turn, to client systems 620 and 630, as well as a server 640. Internetwork 610 (e.g., the Internet) is also capable of coupling client systems 620 and 630, and server 640 to one another. With reference to computer system 510, modem 547, network interface 548 or some other method can be used to provide connectivity from computer system 510 to internetwork 610. Computer system 510, client system 620 and client system 630 are able to access information on server 640 using, for example, a web browser (not shown). Such a web browser allows computer system 510, as well as client systems 620 and 630, to access data on server 640 representing the pages of a website hosted on server 640. Protocols for exchanging data via the Internet are well known to those skilled in the art. Although FIG. 6 depicts the use of the Internet for exchanging data, the present invention is not limited to the Internet or any particular network-based environment.

Referring to FIGS. 4, 5 and 6, a browser running on computer system 510 employs a TCP/IP connection to pass a request to server 640, which can run an HTTP "service" (e.g., under the WINDOWS® operating system) or a "daemon" (e.g., under the UNIX® operating system), for example. Such a request can be processed, for example, by contacting an HTTP server employing a protocol that can be used to communicate between the HTTP server and the client computer. The HTTP server then responds to the protocol, typically by sending a "web page" formatted as an HTML file. The browser interprets the HTML file and may form a visual representation of the same using local resources (e.g., fonts and colors).

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method of detecting and reporting failures in a computer comprised of:

assigning one or more alpha numeric designated event codes exclusively to a particular failure event;

detecting the particular failure event in a device of the computer;

storing the one or more exclusively assigned event codes associated with the detected particular failure event in an error log;

parsing the error log for the one or more stored event codes if the event codes compare to one or more determined values; and relating the parsed event codes to one or more frequently asked question (FAQ) files, the FAQ files accessible by an user and each FAQ file categorized as either a failed FAQ or a passed FAQ.

2. The method of detecting and reporting failures in a computer of claim 1 further comprising:

presenting the one or more FAQ files to an user.

3. The method of detecting and reporting failures in a computer of claim 2 further comprising:

providing customized pages related to the FAQ files to the user comprised of:

creating a template;

inputting into the template relevant content from the error log; and masking out non relevant content from the template.

4. The method of detecting and reporting failures in a computer of claim 3 wherein the FAQ files and the template written in HTML.

5. The method of detecting and reporting failures in a computer of claim 1 wherein the error log is further parsed for redundant event codes.

6. A computer system comprising:

a processor;

computer readable medium coupled to the processor; and computer code, encoded in the computer readable medium, configured to cause the processor to:

assign one or more alpha numeric designated event codes exclusively to a particular failure event;

detect the particular failure event in a device of the computer;

store the exclusively assigned one or more event codes of the detected particular failure event in an error log;

parse the error log for the one or more stored event codes if the event codes compare to one or more determined values; and relate the parsed one or more event codes to one or more frequently asked question (FAQ) files, the FAQ files accessible by an user and each FAQ file categorized as either a failed FAQ or a passed FAQ.

7. The computer system of claim 6 wherein the processor is further configured to:

present the one or more FAQ files to an user.

8. The computer system of claim 7 wherein the processor is further configured to:

provide customized pages related to the FAQ files to the user comprised of:

creating a template;

inputting into the template relevant content from the error log; and masking out non relevant content from the template.

9. The computer system of claim 8 wherein the FAQ files and the template are written in HTML.

10. The computer system of claim 6 wherein the error log is further parsed for redundant event codes.

11. A computer program product encoded in computer readable media, the computer program product comprising:

a first set of instructions, executable on a computer system, configured to assign one or more alpha numeric designated event codes exclusively to a particular failure event;

a second set of instructions, executable on the computer system, configured to detect the particular failure in a device of the computer;

a third set of instructions, executable on the computer system, configured to store the exclusively assigned one or more event codes of the detected particular failures in an error log;

a fourth set of instructions, executable on the computer system, configured to parse the error log for the stored one or more event codes if the one or more event codes compare to one or more determined values; and a fifth set of instructions, executable on the computer system, configured to relate the parsed event codes to one or more frequently asked question (FAQ) files, the FAQ files accessible by an user and each FAQ file categorized as either a failed FAQ or a passed FAQ.

12. The computer program product of claim 11 further comprised of:

a sixth set of instructions, executable on the computer system, configured to:

present the related FAQ files to an user.

13. The computer program product of claim 12 further comprised of:

a eighth set of instructions, executable on the computer system, configured to:

provide customized pages related to the FAQ files to the user comprised of:

creating a template;

inputting into the template relevant content from the error log; and masking out non relevant content from the template.

14. The computer program product of claim 13 wherein the FAQ files and the template are written in HTML.

15. The computer program product of claim 11 further comprised of:

a seventh set of instructions, executable on the computer system, configured to:

parse the error log for redundant event codes.

* * * * *